W. H. BUELL.
IMPACT ILLUMINATED TARGET FOR PLEASURE SHOOTING.
APPLICATION FILED OCT. 11, 1913.
1,093,171. Patented Apr. 14, 1914.
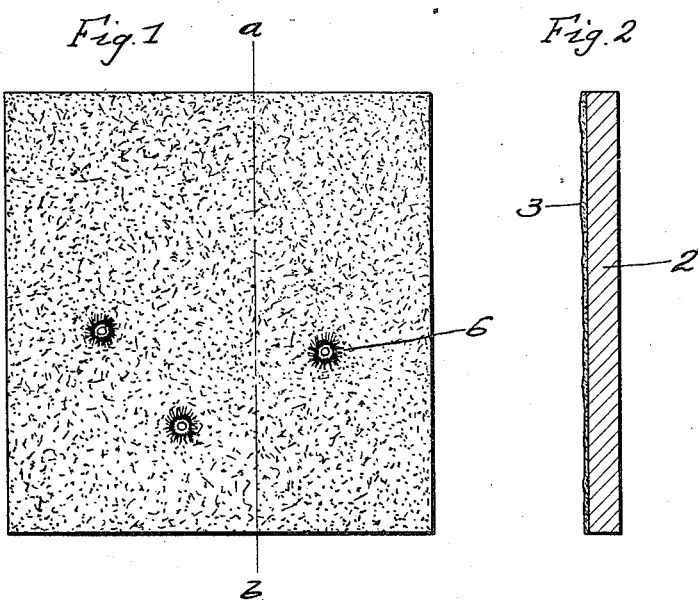
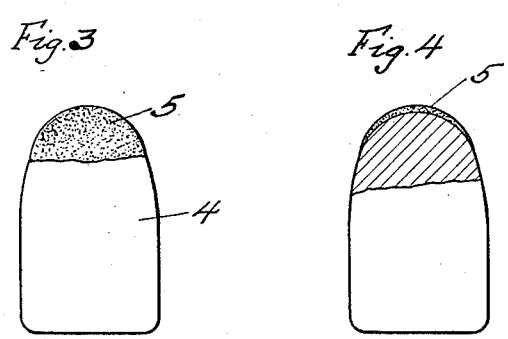

UNITED STATES PATENT OFFICE.

WILLIAM H. BUELL, OF NEW HAVEN, CONNECTICUT, ASSIGNOR TO WINCHESTER REPEATING ARMS CO., OF NEW HAVEN, CONNECTICUT, A CORPORATION.

IMPACT-ILLUMINATED TARGET FOR PLEASURE-SHOOTING.

1,093,171.	Specification of Letters Patent.	Patented Apr. 14, 1914.

Application filed October 11, 1913. Serial No. 794,593.

*To all whom it may concern:*

Be it known that I, WILLIAM H. BUELL, a citizen of the United States, residing at New Haven, in the county of New Haven and State of Connecticut, have invented a new and useful Improvement in Impact-Illuminated Targets for Pleasure-Shooting; and I do hereby declare the following, when taken in connection with the accompanying drawings and the characters of reference marked thereon, to be a full, clear, and exact description of the same, and which said drawings constitute part of this application, and represent, in—

Figure 1 a view in front elevation of a target prepared in accordance with my invention. Fig. 2 a view thereof in vertical section on the line $a$—$b$ of Fig. 1. Fig. 3 a view in side elevation of one form which a bullet prepared for use with my improved target may assume. Fig. 4 a corresponding view with the nose of the bullet in section.

My invention relates to an improved impact-illuminated target for use in pleasure-shooting, the object being to produce a target having its impact surface prepared for its momentary illumination within circumscribed limits upon impact by a bullet also treated with a composition which, when combined with the preparation upon the surface of the target, produces ignition and illumination.

With these ends in view, my invention consists in a target and a bullet specially treated with complementary chemical compositions igniting only when brought together with sharp impact.

In carrying out my invention as herein shown, I employ a target 2 made of iron or any other suitable material. The outer or impact surface of the target has applied to it a coating 3 of a flash-light composition of a character which will ignite only by being brought into violent contact with a complementary composition. For the treatment of the target, I may employ any one of a great variety of well known compositions, such as a mixture of red phosphorus, antimony sulfid, aluminum, and glue. This mixture is applied, by preference, in the form of paint to the surface of the target to which it adheres. The target is ready for use as soon as the paint has had time to dry. I do not, however, limit myself to this particular composition for the treatment of the target, as it may be replaced by a variety of other compositions which would accomplish the same purpose. With such a composition as indicated, I employ an ordinary bullet 4 having its nose superficially treated with a thin coating 5 of a composition chemically prepared so as to be complementary to the composition employed for the treatment of the target. Assuming the target to be treated with the composition specified, the coat 5 may consist of a solution of chlorate of potash combined with sufficient glue or other adhesive to enable it to adhere to the rounded nose of the bullet. I do not limit myself to using such a composition for the treatment of the bullet as other compositions may be employed, always dependent upon the character of the composition employed for the treatment of the target, it being necessary merely that the composition upon the target shall be chemically complementary to the composition upon the bullet, and vice versa, so that the result of their impact will be ignition with momentary illumination about the point of impact. Thus, when such a bullet hits such a target, a brilliantly illuminated spot 6 will appear upon the target at the point of impact, but this spot will not spread over the target as the ignition of the preparation 3 upon the target is closely confined to the point of impact. If the target is hit by an ordinary bullet, or a bullet treated with a non-complementary composition, the point of contact will not be illuminated. The target itself may be of any size and assume a great variety of forms. The interest of shooting at it may be heightened by making it in the form of one or more animals, or having its surface contain pictorial representations of animals, or animals or other objects drawn in outline.

I claim:—

As a new article of manufacture, an impact-illuminated target for pleasure-shooting having its surface treated with an illuminating composition ignited only when combined with a chemically complementary composition carried by a bullet, whereby a circumscribed momentary illumination of the point of impact of the bullet upon the target is effected for the information of the person holding the gun from which the bullet was fired.

In testimony whereof, I have signed this specification in the presence of two subscribing witnesses.

WILLIAM H. BUELL.

Witnesses:
 THOMAS C. JOHNSON,
 M. P. NICHOLS.